(12) United States Patent
Kiyohara et al.

(10) Patent No.: US 9,473,718 B2
(45) Date of Patent: Oct. 18, 2016

(54) VEHICLE SURROUNDINGS MONITORING DEVICE

(71) Applicant: Clarion Co., Ltd., Saitama-shi, Saitama (JP)

(72) Inventors: Masahiro Kiyohara, Tokyo (JP); Shoji Muramatsu, Saitama (JP); Masayuki Takemura, Tokyo (JP); Kota Irie, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 14/411,768

(22) PCT Filed: Jun. 28, 2013

(86) PCT No.: PCT/JP2013/067790
§ 371 (c)(1),
(2) Date: Dec. 29, 2014

(87) PCT Pub. No.: WO2014/007153
PCT Pub. Date: Jan. 9, 2014

(65) Prior Publication Data
US 2015/0172582 A1    Jun. 18, 2015

(30) Foreign Application Priority Data

Jul. 3, 2012    (JP) .................................. 2012-149869

(51) Int. Cl.
*H04N 5/372*    (2011.01)
*H04N 5/225*    (2006.01)
(Continued)

(52) U.S. Cl.
CPC ........... *H04N 5/37213* (2013.01); *B60R 11/04* (2013.01); *B60S 1/56* (2013.01);
(Continued)

(58) Field of Classification Search
CPC ... H04N 5/372; H04N 5/225; H04N 5/37213
See application file for complete search history.

(56) References Cited

U.S. PATENT DOCUMENTS

2001/0028729 A1    10/2001    Nishigaki et al.
2007/0115357 A1    5/2007    Stein et al.
(Continued)

FOREIGN PATENT DOCUMENTS

EP    1 962 254 A2    8/2008
JP    2001-199260 A    7/2001
(Continued)

OTHER PUBLICATIONS

International Search Report (PCT/ISA/210) dated Aug. 6, 2013 with English translation (four pages).
(Continued)

*Primary Examiner* — Abdelaaziz Tissire
(74) *Attorney, Agent, or Firm* — Crowell & Moring LLP

(57) ABSTRACT

A vehicle surroundings monitoring device includes: a captured image acquisition unit that acquires an image of surroundings of a vehicle by an image capturing unit mounted on the vehicle; an attachment detection unit that decides a state in which foreign matter adheres to a lens of the image capturing unit; a state decision unit that decides that the lens is in a lens state in which performance of image recognition is reduced in case that the attachment detection unit decides that the foreign matter adheres to the lens; a lens state recording unit that records the lens state in a recording unit upon termination of a system; and a lens state read-out unit that reads out the lens state recorded in the recording unit upon start of the system.

7 Claims, 15 Drawing Sheets

Figure 1:
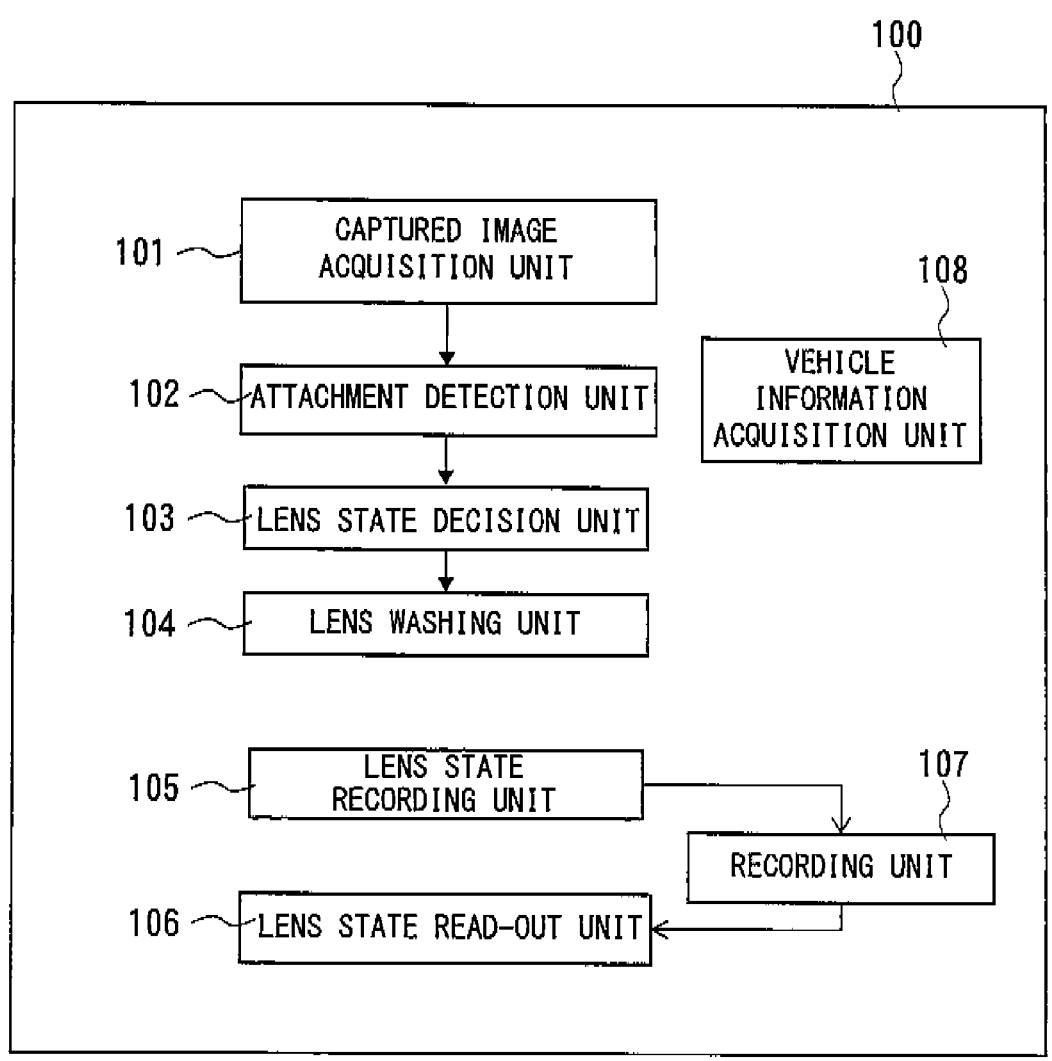

(51) Int. Cl.
*H04N 5/217* (2011.01)
*G06K 9/00* (2006.01)
*B60R 11/04* (2006.01)
*G02B 13/00* (2006.01)
*B60S 1/56* (2006.01)
*B60S 1/08* (2006.01)
*G08G 1/16* (2006.01)

(52) U.S. Cl.
CPC ..... *G02B 13/0015* (2013.01); *G06K 9/00791* (2013.01); *H04N 5/2171* (2013.01); *H04N 5/225* (2013.01); *H04N 5/372* (2013.01); *B60S 1/0848* (2013.01); *G08G 1/16* (2013.01)

(56) References Cited

U.S. PATENT DOCUMENTS

| | | | |
|---|---|---|---|
| 2007/0263902 A1* | 11/2007 | Higuchi | G05D 1/0246 382/104 |
| 2008/0192984 A1* | 8/2008 | Higuchi | G08G 1/16 382/104 |
| 2009/0213249 A1* | 8/2009 | Ikeda | H04N 5/772 348/241 |
| 2010/0073492 A1* | 3/2010 | Kudo | H04N 5/2171 348/208.1 |
| 2010/0074554 A1 | 3/2010 | Gyotoku | |
| 2011/0073142 A1 | 3/2011 | Hattori et al. | |
| 2013/0092758 A1* | 4/2013 | Tanaka | B60S 1/56 239/284.1 |
| 2013/0300869 A1* | 11/2013 | Lu | H04N 7/18 348/148 |
| 2014/0009615 A1* | 1/2014 | Kiyohara | H04N 7/18 348/148 |
| 2015/0334385 A1* | 11/2015 | Takemura | H04N 17/002 348/175 |

FOREIGN PATENT DOCUMENTS

| | | |
|---|---|---|
| JP | 2002-94978 A | 3/2002 |
| JP | 2003-259358 A | 9/2003 |
| JP | 2005-117262 A | 4/2005 |
| JP | 2007-293672 A | 11/2007 |
| JP | 2007-318355 A | 12/2007 |
| JP | 2008-64630 A | 3/2008 |
| JP | 2008-160635 A | 7/2008 |
| JP | 2010-273014 A | 12/2010 |
| WO | WO 2007/066580 A1 | 6/2007 |

OTHER PUBLICATIONS

European Search Report issued in counterpart European Application No. 13813629.6 dated Feb. 25, 2016 (thirteen (13) pages).

* cited by examiner

FIG.4
(a)
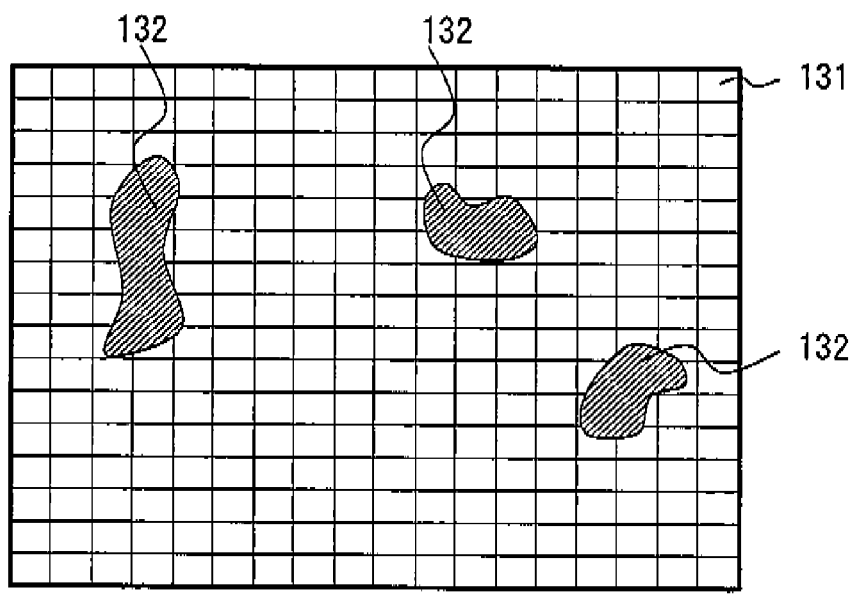
(b)
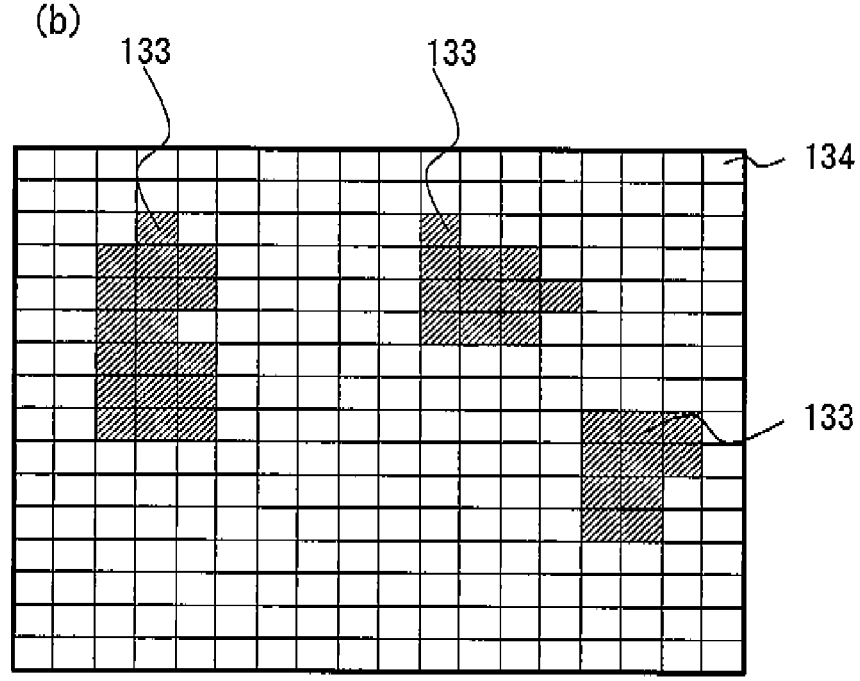

FIG.6

| TYPE | MUD | | |
|---|---|---|---|
| NUMBER OF ATTACHMENTS | 3 | | |
| ATTACHMENT AREA | 39 | | |
| ATTACHMENT TIME | 10 | | |
| DETAILED INFORMATION OF ATTACHMENT | No. | CENTER OF GRAVITY | AREA |
| | 1 | (4, 6) | 18 |
| | 2 | (12, 5) | 11 |
| | 3 | (16, 10) | 10 |
| | 4 | - | - |
| | 5 | - | - |

136

FIG.11
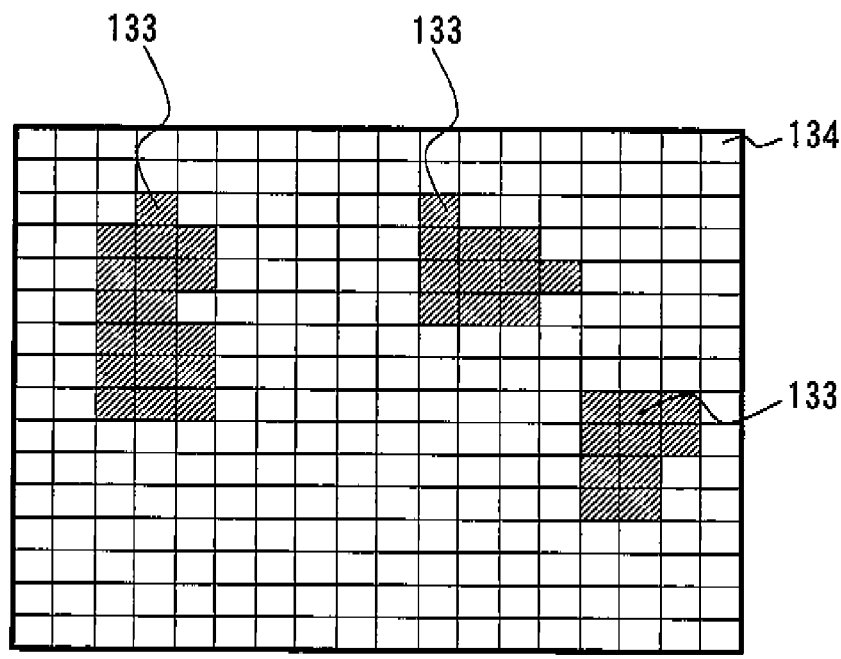
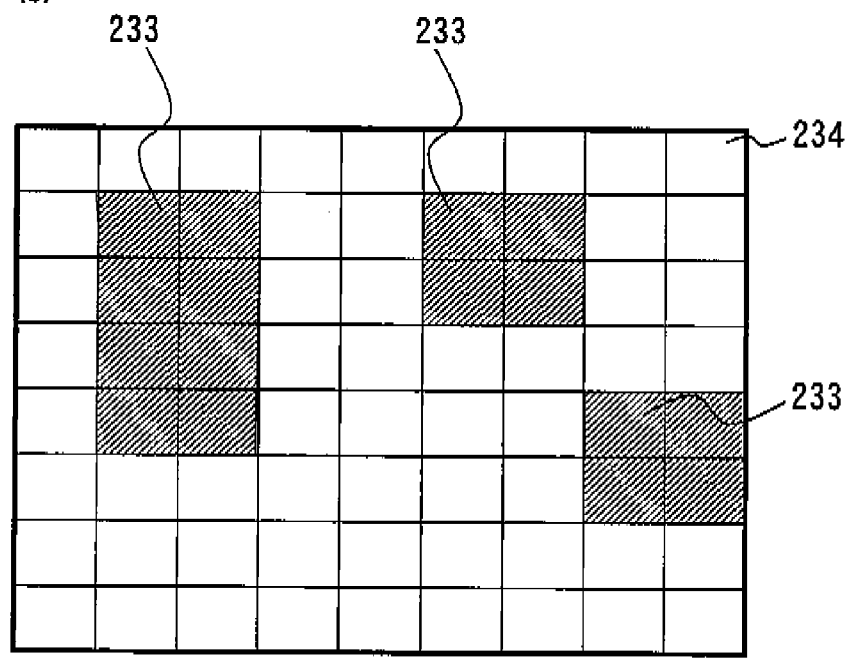

FIG.14

| DETECTION RESULTS | MUD DETECTION RESULT | 136 |
| --- | --- | --- |
| | RAIN DETECTION RESULT | 136 |
| | WHITE TURBIDITY DETECTION RESULT | 136 |
| | WATER DROPLET MARK DETECTION RESULT | 136 |
| | FOREIGN MATTER ATTACHMENT DETECTION | 136 |
| INOPERABLE STATE HISTORY | INOPERABLE STATE OCCURRENCE TIMES COUNTER | 137 |
| | INOPERABLE STATE CAUSE HISTORY | 138 |

135

| INOPERABLE STATE OCCURRENCE TIMES COUNTER | TOTAL CAUSES | 3 |
| --- | --- | --- |
| | MUD | 0 |
| | RAIN | 0 |
| | WHITE TURBIDITY | 3 |
| | WATER DROPLET MARK | 1 |
| | FOREIGN MATTER | 0 |

137

| INOPERABLE STATE CAUSE HISTORY | MUD | - |
| --- | --- | --- |
| | RAIN | - |
| | WHITE TURBIDITY | OCCURRED |
| | WATER DROPLET MARK | OCCURRED |
| | FOREIGN MATTER | - |

138

FIG.15

| RESULT OF DAY-NIGHT DECISION AT THE TIME OF LAST TRAVELING | DAY | |
|---|---|---|
| DETECTION RESULTS | MUD DETECTION RESULT (DAY) | 136 |
| | MUD DETECTION RESULT (NIGHT) | 136 |
| | RAIN DETECTION RESULT (DAY) | 136 |
| | RAIN DETECTION RESULT (NIGHT) | 136 |
| | WHITE TURBIDITY DETECTION RESULT (DAY) | 136 |
| | WHITE TURBIDITY DETECTION RESULT (NIGHT) | 136 |
| | WATER DROPLET MARK DETECTION RESULT (DAY) | 136 |
| | WATER DROPLET MARK DETECTION RESULT (NIGHT) | 136 |
| | FOREIGN MATTER DETECTION RESULT (DAY) | 136 |
| | FOREIGN MATTER DETECTION RESULT (NIGHT) | 136 |
| INOPERABLE STATE HISTORY | INOPERABLE STATE OCCURRENCE TIMES COUNTER (DAY) | 137 |
| | INOPERABLE STATE OCCURRENCE TIMES COUNTER (NIGHT) | 137 |
| | INOPERABLE STATE CAUSE HISTORY (DAY) | 138 |
| | INOPERABLE STATE CAUSE HISTORY (NIGHT) | 138 |

135

VEHICLE SURROUNDINGS MONITORING DEVICE

TECHNICAL FIELD

The present invention relates to a device for monitoring surroundings of a vehicle that is capable of detecting contaminants or dirt at a lens of a camera mounted on a moving body.

BACKGROUND ART

A device is known, which is capable of detecting a vehicle running ahead of an own vehicle or detecting a distance between a preceding vehicle and the own vehicle through a camera mounted on the own vehicle (cf., for instance, Patent Reference 1). As the camera used in this device operates mainly during running of the vehicle, contaminants tend to adhere to a front surface of the lens. If the lens is badly contaminated, it becomes impossible to accurately detect a photographic object such as a preceding vehicle. Accordingly, it is desired to include a means to detect contaminants that adhere to an on-vehicle camera and gives a warning for cleaning the lens to the driver or automatically washes it.

In order to solve this problem, a method of detecting contaminants adhering to the camera has been conceived (cf., for instance, Patent Reference 2). In this method of detecting contaminants, adhered contaminants are detected by capturing images at a plurality of moments by a single camera and extracting differences between the images. According to this method, it is possible to detect contaminants and automatically wash them.

CITATION LIST

Patent Literature

Patent literature 1: Japanese Laid-open Patent Publication No. 2001-199260
Patent literature 2: Japanese Laid-open Patent Publication No. 2003-259358

SUMMARY OF INVENTION

Technical Problem

However, with the above-mentioned conventional method, contaminants (or dirt) that cannot be removed by washing could be detected again as contaminants after the washing, so that washing should be repeated many times. The present invention records adherence of contaminants and prevent useless washing.

Solution to Problem

According to one aspect of the present invention, a vehicle surroundings monitoring device comprises: a captured image acquisition unit that acquires an image of surroundings of a vehicle by an image capturing unit mounted on the vehicle; an attachment detection unit that decides a state in which foreign matter adheres to a lens of the image capturing unit; a state decision unit that decides that the lens is in a lens state in which performance of image recognition is reduced in case that the attachment detection unit decides that the foreign matter adheres to the lens; a lens state recording unit that records the lens state in a recording unit upon termination of a system; and a lens state read-out unit that reads out the lens state recorded in the recording unit upon start of the system.

According to another aspect of the present invention, a vehicle surroundings monitoring device comprises: a captured image acquisition unit that acquires an image of surroundings of a vehicle by an image capturing unit mounted on the vehicle; an attachment detection unit that decides a state in which foreign matter adheres to a lens of the image capturing unit; a state decision unit that decides whether or not the attachment that adheres to the lens of the image capturing unit detected by the attachment detection unit increased; and a lens washing unit that outputs a start signal that commands start of a washing device that washes the lens of the image capturing unit, in case that the state decision unit decides that the attachment that adheres to the lens of the image capturing unit increased, whereas that outputs no start signal that commands start of the washing device that washes the lens of the image capturing unit in case that the state decision unit does not decide that the attachment that adheres to the lens of the image capturing unit increased.

Advantageous Effects of the Invention

According to the present invention, useless washing can be prevented.

DETAILED DESCRIPTION OF THE DRAWINGS

Figure 2:
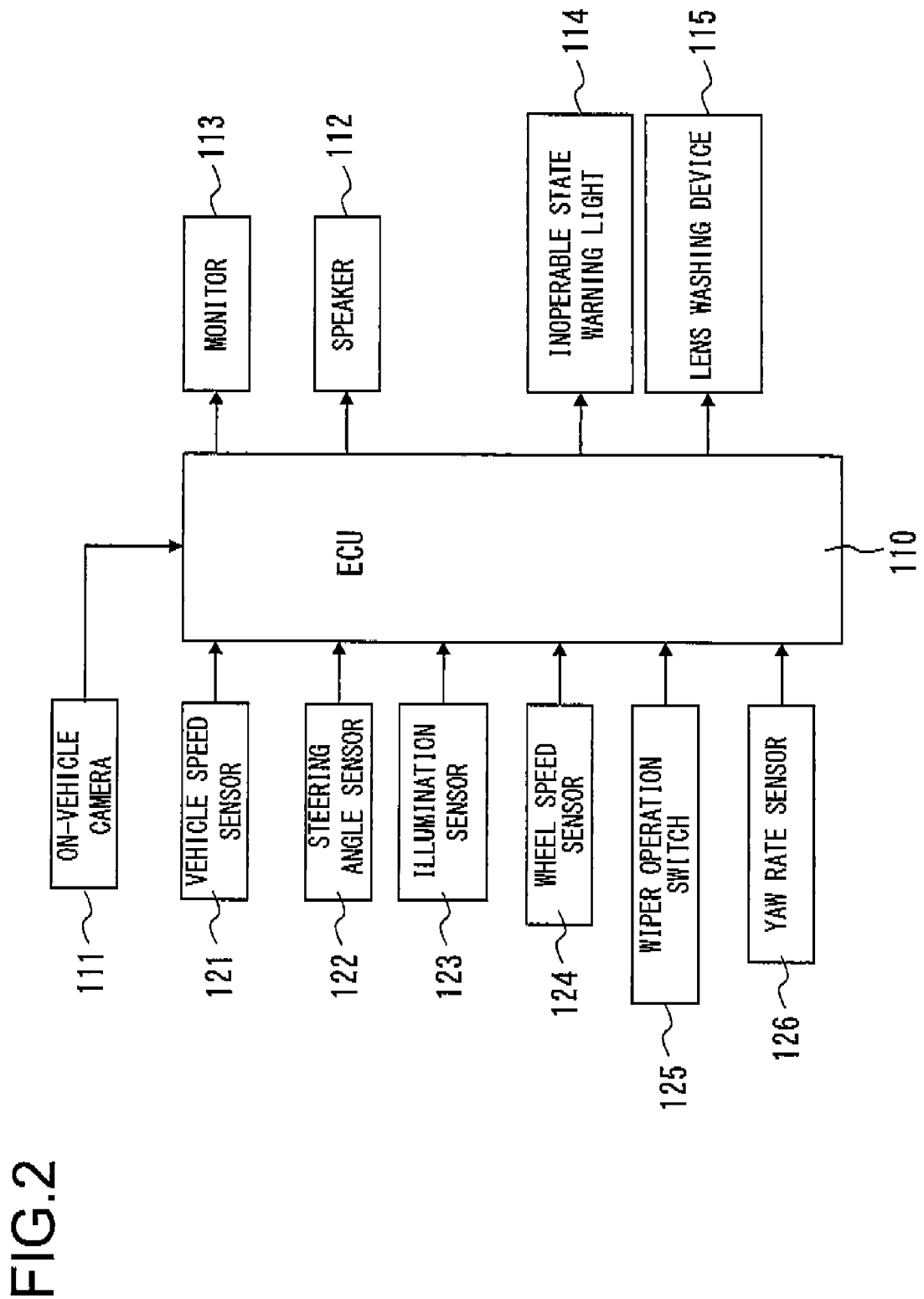
Figure 3:
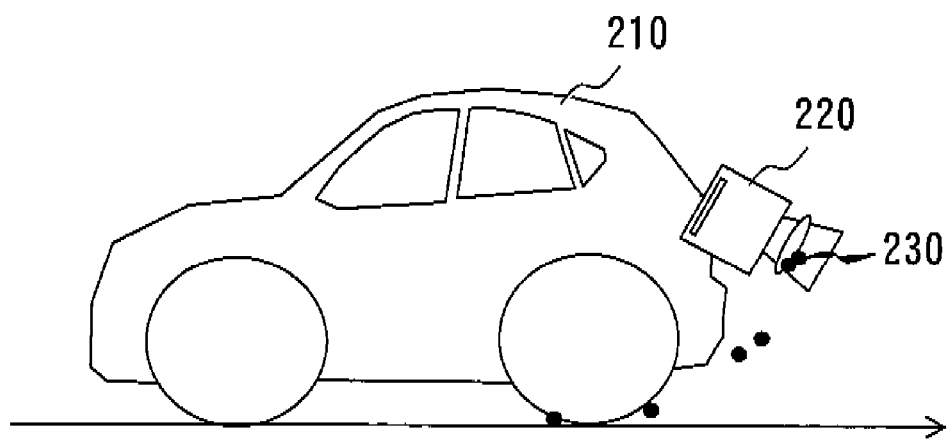
Figure 5:
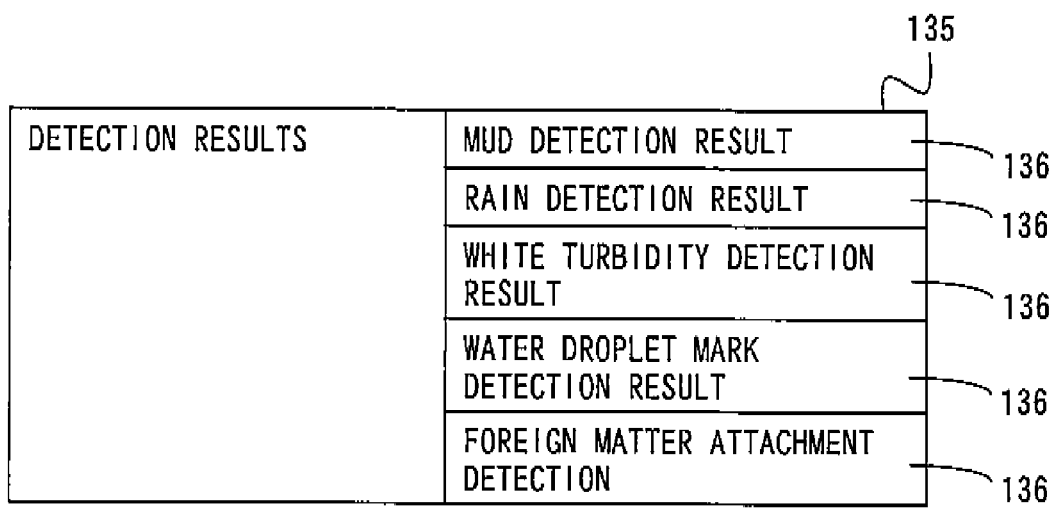
Figure 7:
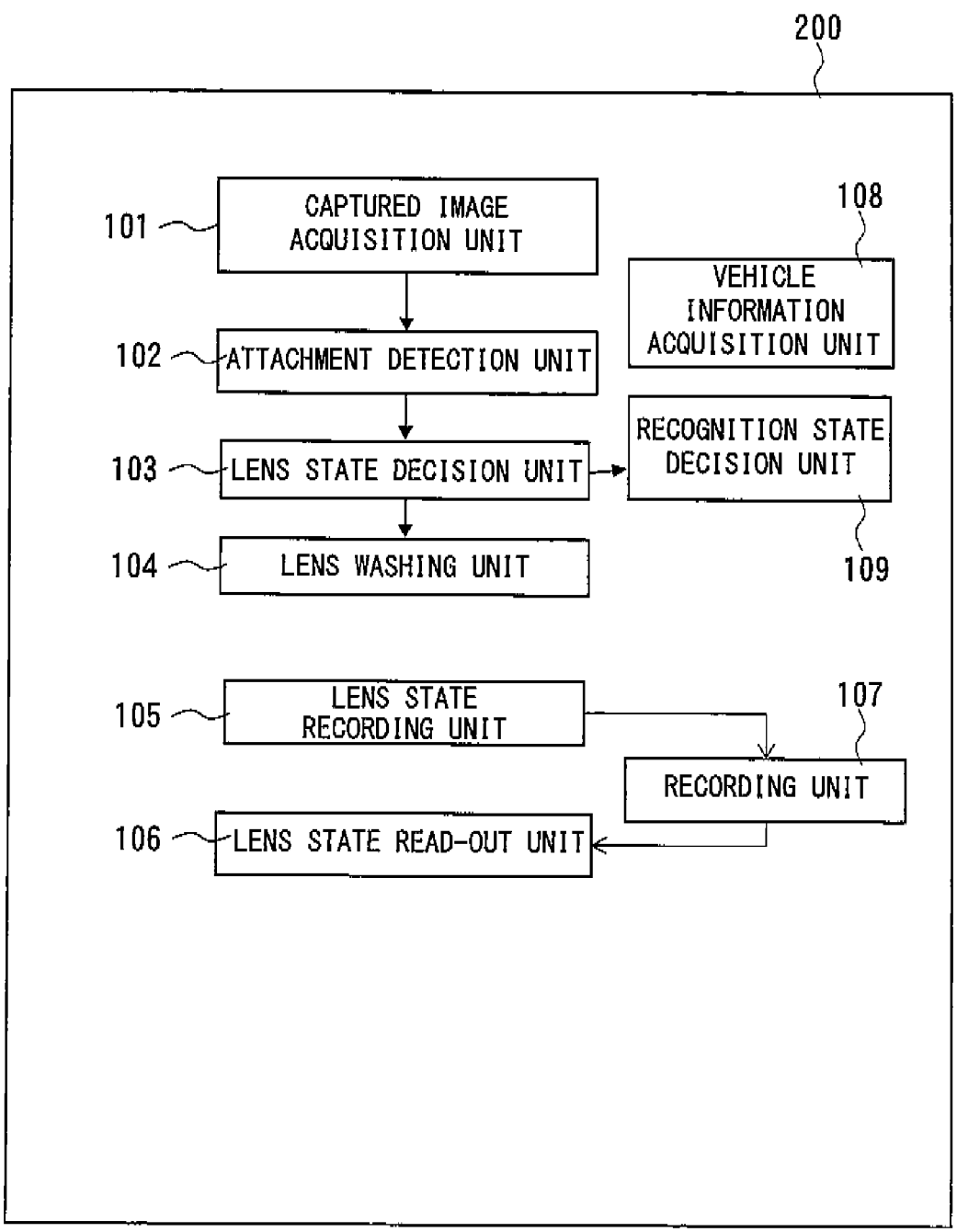
Figure 8:
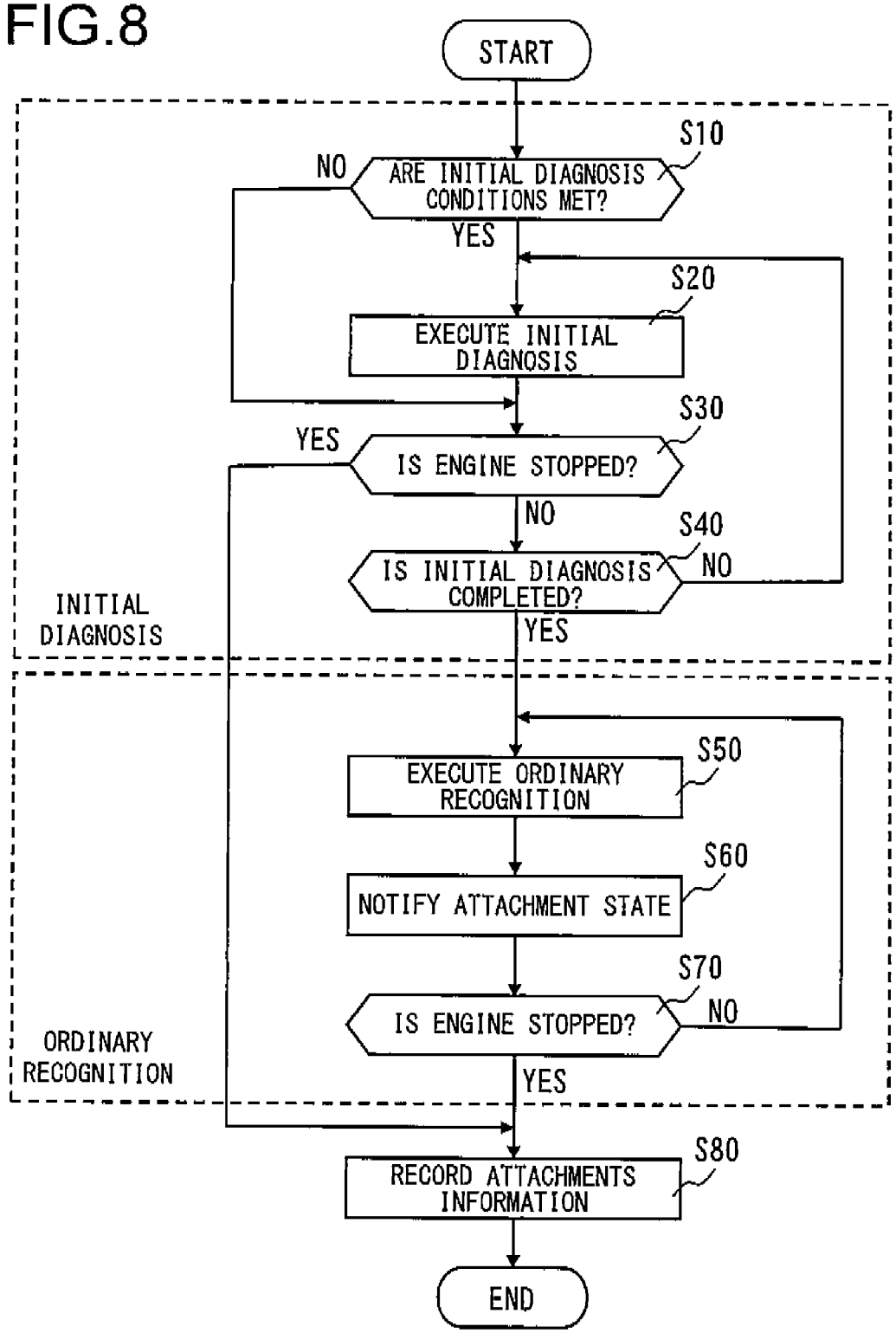
Figure 9:
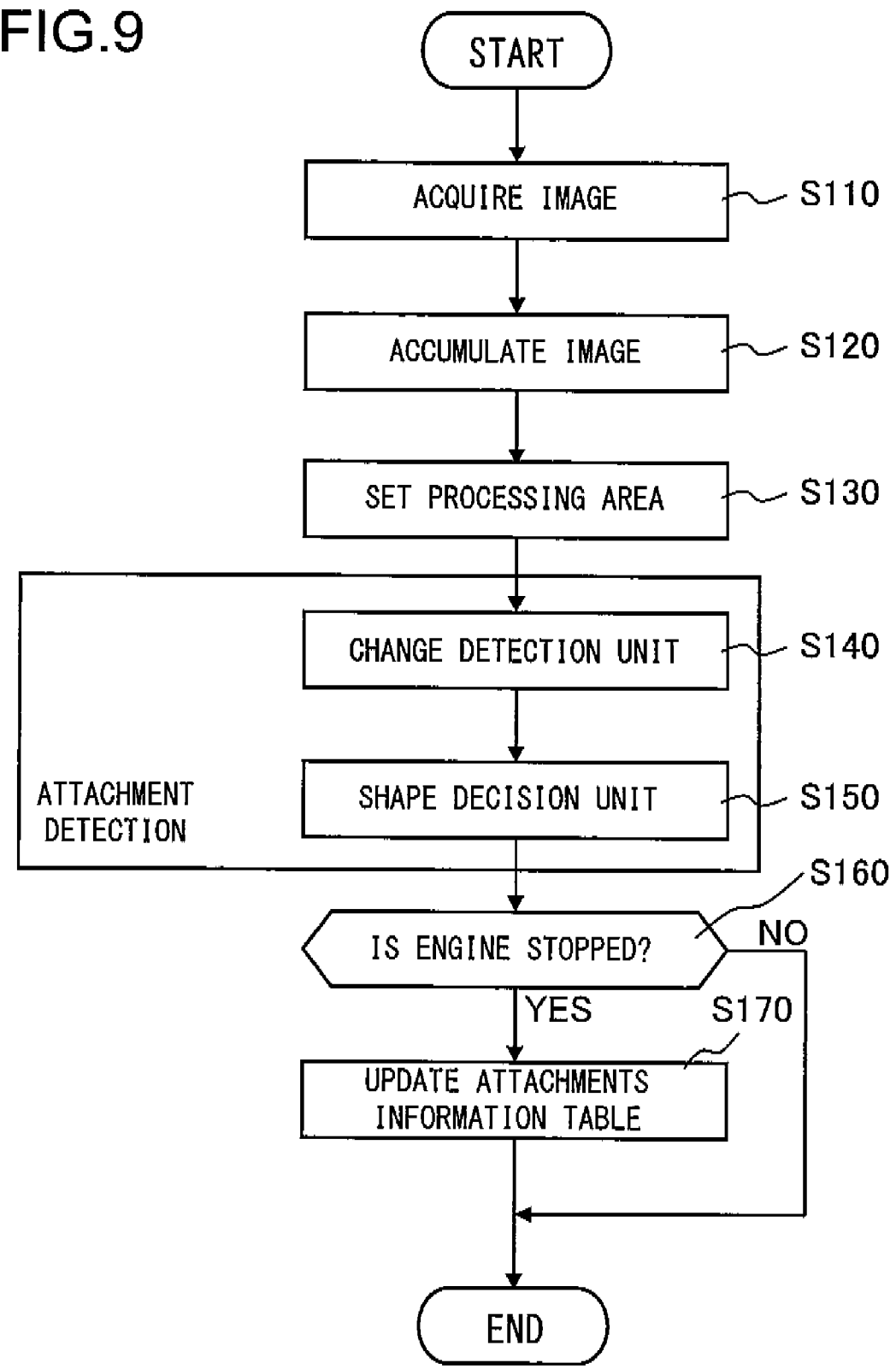

FIG. 1 A diagram showing structural components of the device for monitoring surroundings of a vehicle according to a first embodiment of the present invention FIG 2 A diagram showing a relationship between a device for monitoring surroundings of a vehicle and peripheral devices FIG. 3 A diagram illustrating a state or condition in which a camera is mounted on a vehicle FIG. 4 A diagram illustrating a state or condition in which attachment at the lens is observed in an image FIG. 5 A diagram illustrating an attachment information table FIG. 6 A diagram illustrating detection result table of an attachment detection logic FIG. 7 A diagram relating to the device for monitoring surroundings of a vehicle according to a second embodiment of the present invention FIG. 8 A diagram illustrating an example of a flowchart relating to operation of the device for monitoring surroundings of a vehicle according to each embodiment of the present invention FIG 9 A diagram illustrating an example of a flowchart relating to processing of initial diagnosis shown in FIG. 8

Figure 10:
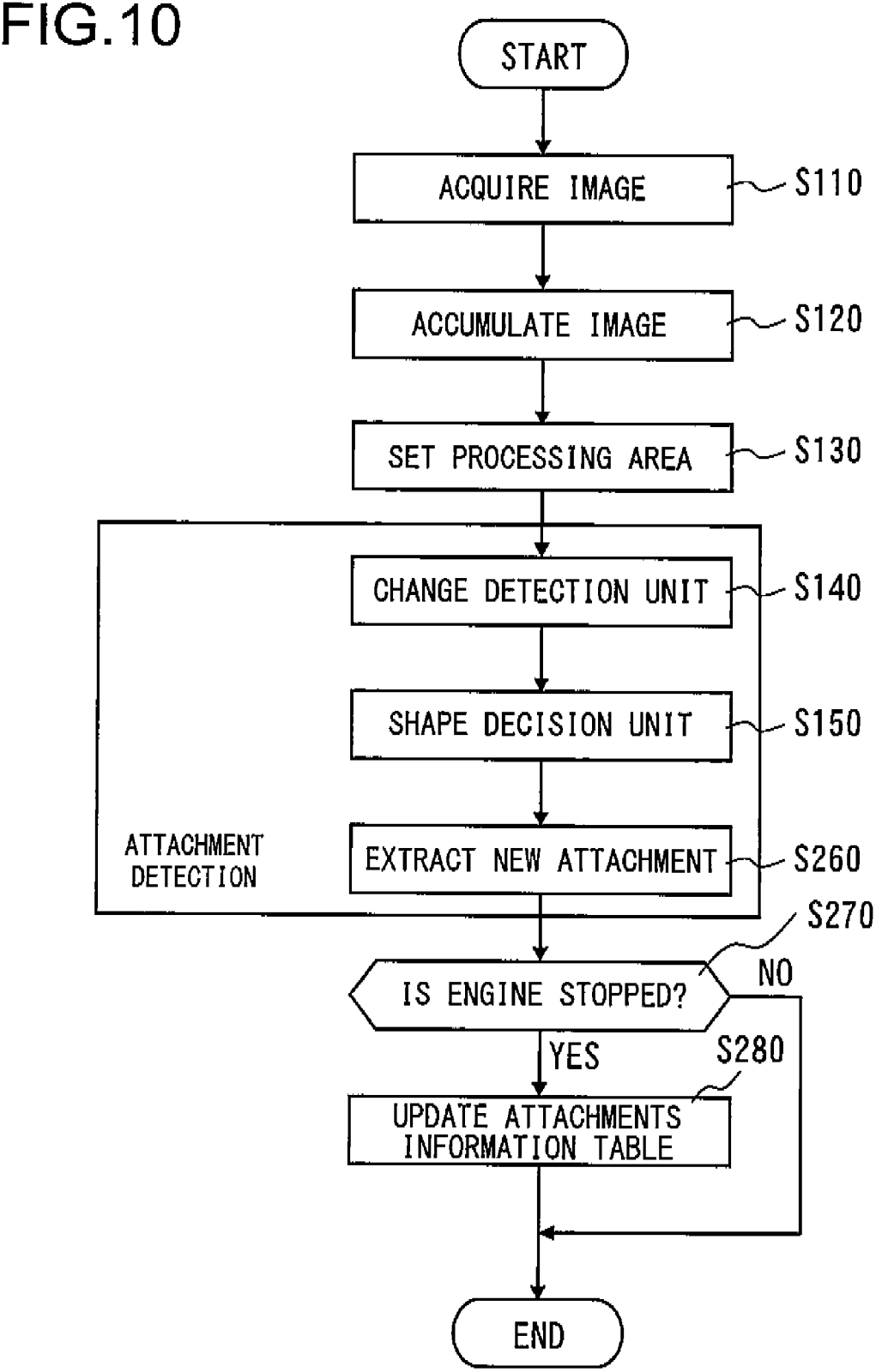

FIG. 10 A diagram illustrating an example of a flowchart relating to processing of ordinary recognition illustrated in FIG. 8

Figure 12:
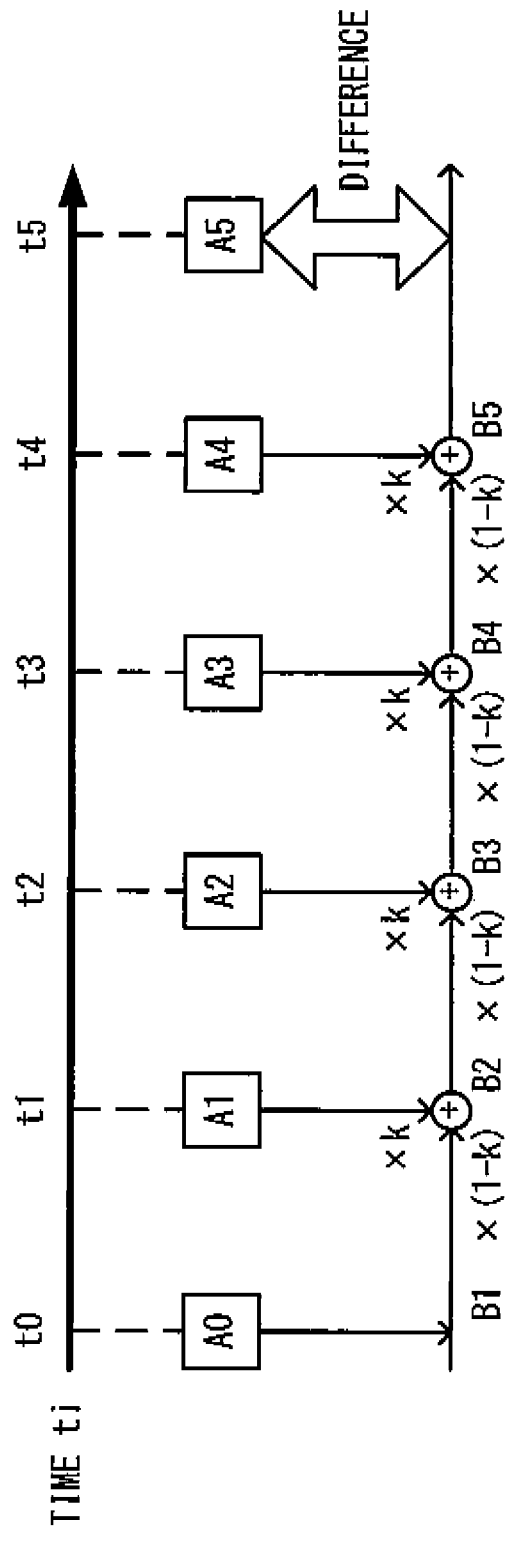
Figure 13:
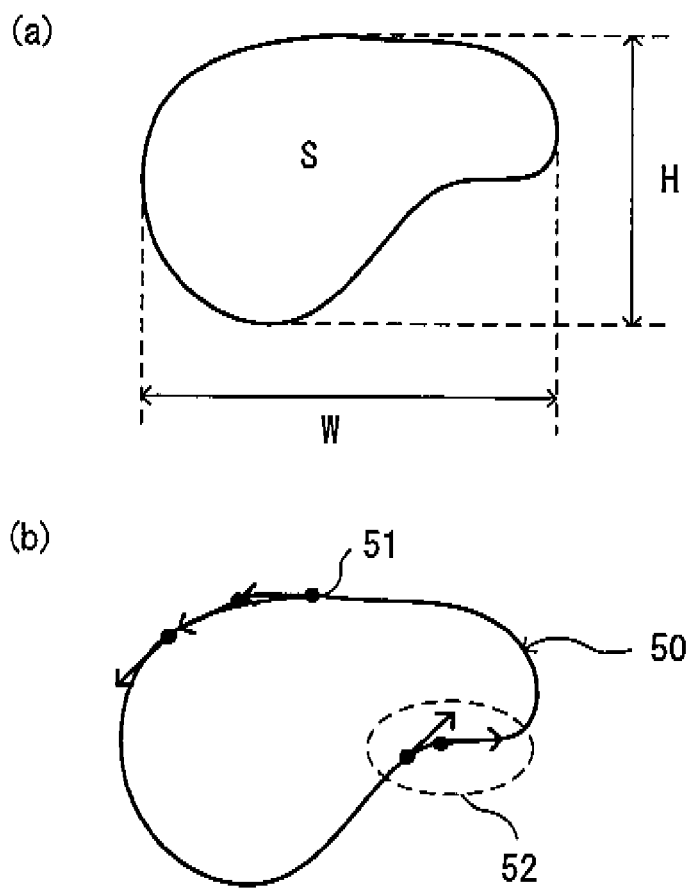

FIG. 11 A diagram illustrating a variation example in which an attachment position mask is provided on a block basis FIG. 12 A diagram illustrating a method of creating a differential image FIG. 13 A diagram illustrating decision of shape FIG. 14 A diagram illustrating an attachment information table according to a second embodiment of the present invention FIG. 15 A diagram illustrating an attachment information table according to a second embodiment of the present invention

DESCRIPTION OF EMBODIMENTS

Next, a device for monitoring a vehicle according to an embodiment of the present invention is explained with reference to the attached drawings.

(First Embodiment)

According to the first embodiment of the present invention, first, upon starting an engine, the type, amount and site of attachments (foreign matter, contaminants (or dirt)) (hereafter, referred to as "attachments information") recorded at the time when the engine was lastly stopped is read in. Next, during running within a predetermined time from the start of the engine (hereafter, referred to as "within an initial diagnosis time"), the surroundings of the vehicle is monitored with an on-vehicle (in-vehicle) camera in order to decide whether attachments such as rain drops, mud, white turbidity (cloudiness matter), water drop marks, fallen leaves, and so on are attached. If the amount of attachments has increased as compared with the amount of attachments recorded by a predetermined amount or more, a washing device is operated. Then, the attachments information is recorded at the time when the engine is stopped.

FIG. 1 presents a diagram illustrating the construction of the device for monitoring surroundings of a vehicle according to the first embodiment of the present invention. The device for monitoring surroundings of a vehicle (hereafter, sometimes referred to as "vehicle surroundings monitoring device" or "monitoring device" for short) 100 is to detect attachments that adhere to a camera lens. It is built in in an image processing ECU (Electric Control Unit) not shown. The monitoring device 100 is not limited to one that is built in in the image processing ECU but may be constituted by a dedicated ECU or another on-vehicle ECU such as an ECU of an on-vehicle camera (not shown in FIG. 1). As an alternative, it may be constituted by a combination of a plurality of ECUs.

As shown in FIG. 1, the monitoring device 100 includes a captured image acquisition unit 101, an attachments detection unit 102, a lens state decision unit 103, a lens washing unit 104, a lens state recording unit 105, a lens state reading unit 106, a recording unit 107, and a vehicle information acquisition unit 108. The captured image acquisition unit 101 acquires captured images that are captured at predetermined time intervals by the on-vehicle camera (not shown in FIG. 1). The attachments detection unit 102 has means for detecting at least one type of attachments such as mud, water droplets, white turbidity and fallen leaves. The lens state decision unit 103 compares a lens state read-out by the lens state read-out unit described later from the recording unit 107 with a lens state (details of which are described later) obtained from the attachments detection unit 102 and decides whether or not the amount of attachments at the lens increased in order to decide the lens state is at a level at which the performance of image recognition is decreased. Here, the term "image recognition" includes at least one of vehicle detection processing, pedestrian detection processing, lane marking recognition processing, and traffic sign recognition processing. The lens state decision unit 103 decides a lens state in which image recognition is impossible or the performance of image recognition is decreased if the amount of attachments to the lens increased. The lens washing unit 104 transmits an activation signal to a lens washing device that is capable of performing at least one of air blasting, washer fluid spraying, and wiper operation to activate it and have the lens surface washed, The vehicle information acquisition unit 108 acquires at least one piece of vehicle information among vehicle speed, wheel speed, steering angle, illumination information, wiper operation switch information, and yaw rate information. The lens state recording unit 105 transmits the lens state at the time when the engine was stopped to the recording unit 107 to cause it to be recorded therein. The lens state read-out unit 106 reads out the lens state from the recording unit 107 at the time of starting the engine.

FIG. 2 presents a block diagram illustrating the relationship between the monitoring device 100 and peripheral devices thereof. FIG. 2 depicts an ECU 110 as the ECU that constitutes the monitoring device 100. On the input side of the ECU 110 is connected an on-vehicle camera 111, a vehicle speed sensor 121, a steering angle sensor 122, an illumination sensor 123, a wheel speed sensor 124, a wiper operation switch 125, and a yaw rate sensor 126. The on-vehicle camera 111 is used in observing surroundings such as forwards or backwards of the own vehicle (or subject vehicle). The ECU 110 acquires speed of the own vehicle from the vehicle speed sensor 121. The ECU 110 acquires the rotation angle of a steering wheel of the own vehicle from the steering angle sensor 122. The ECU 110 also acquires a state of lighting of lights such as head lights, turn signals of the own vehicle for the illumination sensor 123. The ECU 110 acquires rotation speeds of respective wheels from the wheel speed sensor 124. The wiper operation switch 125 is manually operated by the driver or automatically operated coupled with attachment of rain droplets to the window glass to activate front windshield wipers or rear windshield wipers. The ECU 110 acquires a change in the direction of running of the vehicle from the yaw rate sensor 126.

On the output side of the ECU 110 that constitutes the monitoring device 100 are connected a speaker 112 that outputs a warning sound, a monitor 113 that is operable to display a target to which the warning is output, and a lens washing device 115. The lens washing device 115 is activated on the basis of an activation signal transmitted from the lens washing unit 104 to perform air blasting, washer liquid spraying, wiper operation or the like to wash the camera lens of the on-vehicle camera 111.

The on-vehicle camera 111 is a so-called monocular camera, which is attached to the vehicle for capturing images of the surroundings of the own-vehicle, The on-vehicle camera 111 is not limited to a rear camera that captures images of backwards of the vehicle but may be a front camera that captures images of forwards of the vehicle or a side camera that captures images of sideways of the vehicle. It may be a camera that includes all of them.

The monitor 113 may be configured to display a video picture of the on-vehicle camera 111 and a result of image recognition in superposition one on another. Alternatively, it may be configured to display the result of recognition in the form of an icon or it may notify the result of recognition only with a lamp such as an LED or an electric bulb. Also, it may be one that includes all of them.

The on-vehicle camera 111 is, for instance, a CCD camera or a CMOS camera, which receives visible light or near infrared light or far-infrared light incident to the lens at light receiving elements (not shown). It accumulates charges depending on the intensity of light received at the light receiving elements (not shown) and outputs a signal depending on the accumulated charges after amplification. In recent years, there is a camera that includes therein a storage element and a processor and is capable of correct lens distortion in the camera after the image capturing before the captured image is outputted. In many cases the output is in the form of analog or digital signal. Explanation will be made assuming that in the first embodiment, analog signals are used. The analog video signal outputted is subjected to A/D conversion at the captured image acquisition unit 101. It may be configured to acquire the video image of the same signal at a brighter or darker brightness value by varying a mapping parameter between voltage and brightness value for the A/D conversion before the video image can be stored in a memory (not shown).

By using the image stored in the memory (not shown), attachments detection is carried out at the attachments detection unit 102. The attachment detection unit 102 uses at least one of water droplets detection, mud detection, white turbidity detection, water droplet marks detection, and foreign matter adherence detection. However, it may be configured to perform a plurality of types of detection operations and hold the respective results thereof. An outline of each of the detection logics will be described later.

The attachments detection unit 102 outputs pieces of information called attachment position mask and attachment information table, respectively, as outputs of the detection logics. The attachment position mask, details of which are described later, is outputted for each of the detection logics.

In FIG. 4(b), an attachment position mask 134, which corresponds to a screen illustrated by an example in FIG. 4(a), is illustrated by an example. In FIG. 4(a), the attachments 132 detected by the detection logic are illustrated by examples. The attachment position mask 134 in FIG. 4(b) includes attachment areas 133 at positions corresponding to the attachments 132, respectively.

The attachment detection unit 102 outputs the attachment position mask 134 shown in FIG. 4(b) corresponding to the attachments 132 detected by the detection logic as illustrated by an example in FIG. 4(a) and the attachments information table 135 including the number and area of attachments as shown in FIG. 5.

The attachment position mask 134 and the attachments information table 135 outputted by the attachment detection unit 102 are transmitted by the lens state recording unit 105 to the recording unit 107 and stored thereat as a final lens state of the traveling this time at the time when the engine is stopped or when power supply to the system is stopped by using power supply from a storage battery, which is not shown. Here, it is explained that the recording occurs at the time when the engine is stopped. However, the lens state recording unit 105 may be configured to perform recording operation for every predetermined time while the engine is active and eventually record the final lens state of the traveling this time is recorded at the time when the engine is stopped. In this case, there is obtained an advantageous effect that the storage battery becomes unnecessary. As an alternative, the lens state recording unit 105 may be configured to start recording operation at the time when the vehicle speed is decreased to a predetermined level or lower with regarding such state as stoppage. In this case too, the storage battery becomes unnecessary and the number of times of writing at the recording unit 107 can be reduced, so that an advantageous effect that the life time of the recording device is prolonged can be obtained.

The lens state read-out unit 106 reads out the attachment position mask 134 and the attachments information table 135 as lens information representing the final lens state of traveling previous time at the time when the engine is started or when power supply to the system is started. In this case too, it is explained that the reading occurs at the time when the engine is started. However, for instance, the lens state read-out unit 106 may be configured not to read-out the lens information until the vehicle speed exceeds a predetermined speed for the first time after the start of the engine. With this configuration, an advantageous effect of reducing the number of times of reading out, which is otherwise frequent, by the recording unit 107 can be obtained.

The recording unit 107, which is constituted by, for instance, a flash-ROM, a hard disk drive, or a solid state disk drive, communicates with the lens state recording unit 105 and the lens state read-out unit 106 and records received information therein and transmits recorded information therefrom in response to requests from them, respectively. In addition, the recording unit 107 may be provided with a function to record error states at the time of reading and writing and use only recording blocks in which no error has occurred.

Next, the lens state decision unit 103 compares the attachment position mask and the attachments information table detected by the attachment detection unit 102 with the attachment position mask and the attachments information table recorded at the time when the engine was stopped previously and read-out by the lens state read-out unit 106. If the detected amount of attachments is increased as compared with the previous amount of attachments by a predetermined amount or more, it outputs a signal to command activation of a washing device to the lens washing unit 104. The lens state referred to in the explanation of the lens state decision unit 103 indicates the attachment position mask and the attachments information table.

The lens washing unit 104 controls the lens washing device 115, which is constituted by at least one of air nozzles, washer liquid nozzles, and wiper blades and causes the lens washing device 115 to perform washing of the lens.

In addition, the vehicle information acquisition unit 108 receives at least one of vehicle speed, wheel speed, steering angle, illumination information, wiper operation switch information and yaw rate information from the vehicle via CAN (Car Area Network).

Next, cooperation between the ECU 110 and peripheral devices is explained with reference to FIG. 2. The ECU 110 inputs therein a video image from the on-vehicle camera 111. In addition, it receives sensor information and switch information from the vehicle speed sensor 121, the steering angle sensor 122, the illumination sensor 123, the wheel speed sensor 124, wiper operation switch 125, and the yaw rate sensor 126 in order to calculate the behavior of the own vehicle at that time. The sensors may be any sensors that are used for calculating the behavior of the own vehicle. For instance, a wheel speed pulse sensor, a steering wheel angle sensor, a steering angle power aid device, a wheel height sensor, a GPS sensor, an acceleration sensor or the like may be used. The illumination sensor 123 is a sensor that indicates the state of lights of the own vehicle. For instance, the situation in which light is illuminated is judged to be related to an environment in which surroundings are dark. In addition, brightness of surroundings can be acquired by using a luminance sensor used in an automatic head-light lighting device or brightness signal, aperture information and shutter speed information obtained from the on-vehicle camera 111 or the like.

The ECU 110 displays the result of the monitoring of surroundings of the vehicle on the monitor 113. As need arises, it causes the speaker 112 to issue a warning sound. For instance, in case that the amount of attachments is large or that attachments are found on the image in an area that corresponds to the processing area of the image recognition logic such as white line detection or vehicle detection, it notifies to the user that the system is inoperative.

With reference to FIG. 3, FIGS. 4(a) and (b), FIG. 5 and FIG. 6, explanation is made on the attachment position mask and contents of the attachments information table that are recorded by the recording unit 107.

FIG. 3 presents a diagram indicating the condition of the camera mounted on the vehicle. FIG. 4(a) and (b) presents a diagram indicating the condition in which attachments are observed in the image. FIG. 5 presents a diagram illustrating the attachments information table.

The on-vehicle camera 111 is an on-vehicle camera 220 that is mounted on a vehicle 210 as shown in FIG. 3. Attachments 230 such as mud, water droplets, rain droplets, ice grains, snow melting agents and so on may adhere to the camera lens due to throwing up by the wheels during running of the vehicle or rain fall or snow fall. Such attachments 230 may appear transparent, semi-transparent, or opaque depending on the type of the attachment and light source. In addition, the image of the attachments captured through the attachments may be changed due to a dynamic change in illumination environment during the traveling. Furthermore, since the attachments are seen differently between day and night, provision of a detection logic for each attachment for day and night, respectively, results in increased detection performance.

FIG. 4(a) shows the condition in which the attachments 132 are present on a surface of the camera lens 131. By means of the detection logics such as water droplets detection, mud detection, white turbidity detection, water droplet marks detection, and foreign matter adherence detection, the attachment areas 133 on an image is specified corresponding to the position of the attachments 132, respectively as shown in FIG. 4(b). The attachment areas 133 are recorded as the attachment position mask 134 for each of the detection logics. The attachment position mask 134 does not have to have the same resolution as that of the input image and may have a different resolution for different detection logic. Changing the resolution of the attachment mask 134 provides advantageous effects of saving the capacity of memory that is necessary for recording and shortening writing time necessary for recording.

As shown in FIG. 5, the attachment table 135 includes detection result tables 136 for respective attachment detection logics.

By means of each of the attachment detection logics, the attachment specific to the logic is detected and number, area, center of gravity, and attachment time of the attachments can be obtained. The attachments detected within a predetermined time after starting the system are recorded, which are distinguished from the additional attachments during the traveling thereafter. With these measures, washing operation is performed to new attachments and washing is prevented for the attachments from the beginning. This provides advantageous effects of avoiding useless washing operations.

FIG. 6 illustrates an example of the detection result table 136 of the attachment detection logic. As illustrated in FIG. 6 by an example, the detection result table 136 includes at least one or more pieces of information among various pieces of detailed information about attachments such as the type of the attachment, which is the target of detection of each detection logic, number of attachments representing the number of independent attachments, attachment area corresponding to number of pixels the attachment observed on the image covers, attachment time corresponding to a time elapsed from the time at which the attachment was first observed, center of gravity and area of each attachment.

The operation of the vehicle surroundings monitoring device 100 according to the first embodiment is explained according to the flowchart illustrated in FIG. 8. The monitoring device 100 has two states, i.e., a state in which initial diagnosis processing is executed and a state in which ordinary recognition processing is executed.

First, in step S10, the ECU 110 decides whether or not conditions under which the initial diagnosis is to be executed are met by using at least one of vehicle speed, steering angle, and day-night decision state. If the conditions for executing the initial diagnosis have been met, the ECU 110 sets an initial diagnosis counter to 0 and the process proceeds to step S20 in which the initial diagnosis is to be executed. If a stable traveling condition has been met, for instance, if the vehicle speed is 30 km/h or more, it is assumed that the condition for executing the initial diagnosis is met ("Yes" in step S10). If a decision is made that the condition or conditions for stable traveling have not been met ("No" in step S10), the execution of the initial diagnosis is skipped. Then, the process proceeds to step S30. By making the vehicle speed of 30 km/h or more as a condition, the attachment detection logic is able to extract an area showing a relatively small change in a moving background image as an attachment, so that the reliability of the result of the attachment detection can be advantageously increased. If the vehicle speed changes greatly or the steering angle is relatively large, it is highly possible that the light source of surrounding shops or the direction of sunlight changes and in such a case, execution of the initial diagnosis may be skipped to avoid wrong initial diagnosis. Furthermore, if the day-night decision state changes from day to night or from night to day, that is, if, for instance entrance into and exit of the vehicle from a tunnel occur, execution of the initial diagnosis (step S20) may be skipped, thereby avoiding wrong initial diagnosis.

Next, in step S20, the ECU 110 executes an initial diagnosis. The initial diagnosis is executed by the attachment detection unit 102 to perform detection of attachments such as water droplets detection, mud detection, white turbidity detection, water droplet marks detection, and foreign matter attachment detection. Each time when the processing in step S20 is executed, a counter called initial diagnosis counter is incremented.

In step S30, the ECU 110 decides whether or not the engine is stopped. If the engine is not stopped ("No" in step S30), the process proceeds to step S40 to further continue processing. If the engine is stopped ("Yes" in step S30), the ECU 110 updates the attachments information table 135 using the attachments information obtained in the initial diagnoses executed up to that point in time and the process proceeds to step S80 in which recording of the attachments information is performed.

In step S40, the ECU 110 decides whether or not the initial diagnosis is completed. The condition for completion of the initial diagnosis is assumed to be that all the initial diagnosis executing logics are executed a predetermined number of times or for a predetermined period of time and that stable results are obtained. If the initial diagnosis is completed ("Yes" in step S40), the ECU 110 terminates the initial diagnosis and shifts to ordinary recognition. If the initial diagnosis is not completed ("No" in step S40), the process at the ECU 110 proceeds to step S20 and the initial diagnosis is executed. If a predetermined period of time (for instance 3 minutes) has elapsed from the start of the initial diagnosis, that is, the initial diagnosis counter indicates a predetermined value or more, the initial diagnosis may be deemed to have been completed.

In step S50, the ECU 110 causes the attachment detection unit 102 to execute attachment detection such as water droplets detection, mud detection, white turbidity detection, water droplet marks detection, and foreign matter adherence detection on the lens surface of the on-vehicle camera 111. On this occasion, the attachment detection is executed with parameters different from those at the time of the initial diagnosis in step S20 and by using the attachment position mask 134 it makes possible to detect an increase in the amount of attachment as compared with that at the time of the initial diagnosis for areas where no attachment adheres at the time of the initial diagnosis. This means that the attachment areas 133 in the attachment position mask 134 are excluded from the attachments detected by the attachment detection in step S50 and only the remaining areas are subject to adding up amounts of attachments in order to extract the amount of only newly increased attachments. In step S50, the amount of attachments on the lens and the amount of newly increased attachments are outputted.

In step S60, the ECU notifies the state of attachment to the washing system on the basis of the amount of attachments outputted in step S50. The details of step S60 is described later.

The ECU 110 decides in step S70 whether or not the engine is stopped. If the engine is not stopped ("No" in step S70), it continues the processing further ahead. If the engine is stopped ("Yes" in step S70), it updates the attachments information table 135 obtained in the initial diagnoses executed up to that point in time and the process proceeds to step S80.

In step S80, the ECU 110 records the contents of the attachment position mask and of the attachments information table through the recording unit 107.

Next, the processing at the time of initial diagnoses at the vehicle surroundings monitoring device 100 according to the first embodiment is explained on the basis of the flowchart illustrated in FIG. 9. This processing corresponds to the processing in steps S20 and S30 illustrated in FIG. 8, with step S160 in FIG. 9 corresponding to step S30 in FIG. 8. The processing in FIG. 9 is executed by the ECU 110.

The initial diagnosis processing is executed first by acquiring images through the on-vehicle camera 111 in step S110 and the process proceeds to image accumulation processing in step S120. Next, in step S120, the acquired images are recorded in a memory, which is not shown. The image accumulation is performed by writing new images into an image memory that is capable of storing a predetermined number of frames of images such as a ring buffer to overwrite old accumulated images. For instance, by writing once for 100 msec into a ring buffer having a capacity of storing 6 frames, always images captured for 500 msec from the newest image can be held. Next, in step S130, a processing area is set. For instance, for a vehicle which is traveling, a road area in the image is set to a processing area.

Next, in step S140, a change in the processing area set in step S130 is detected on the basis of a plurality of captured images outputted at different times from the on-vehicle camera 111. Hereafter, detection of this change is referred to as a change detection unit S140. The change detection unit S140 creates an image referred to as a differential image from a plurality of captured images as a result of detection.

With reference to FIG. 12, a method of creating a differential image is explained. The differential image is created by calculating a difference between the newest captured image and a reference image. The reference image is created on the basis of previous captured images outputted consecutively in chronological order from the on-vehicle camera 111 before the newest captured image is outputted.

In FIG. 12, an arrow is depicted which indicates a time course. On the arrow are depicted calibrations of times t0 through t5 according to frame rate of the camera 1. Below the arrow indicating the time course are depicted captured images A0 through A5 outputted from the on-vehicle camera 111 at times t0 through t5, respectively. The captured images A0 through A5 are stored in the memory as soon as they are outputted from the on-vehicle camera 111 in sequence. It is assumed that accumulation of the captured images in the memory was started at time t0. That is, in FIG. 12, the captured image A0 is the oldest captured image and the captured image A5 is the newest captured image among the captured images stored in the memory.

A reference image Bi is created at the time when a captured image Ai is outputted (for example, time t5) by using a captured image Ai−1 stored in the memory immediately before (for instance, the captured image A4), and a reference image Bi−1 at the time when the captured image Ai is outputted, according to the expressions [1] and [2] below.

$$Bi=Ai-1 \text{ (provided that } i=1\text{)} \quad [1]$$

$$Bi=k \times Ai-1+(1-k) \times Bi\text{'}1 \text{ (provided that } i>=2\text{)} \quad [2].$$

Here, k is a coefficient of 0<k=<1, for instance, k=0.1.

The change detection unit S140 creates a differential image between the newest captured image outputted from the on-vehicle camera 111 (for instance, the captured image A5) and the reference image used at the time when the newest image was outputted (for instance, the reference image B5).

In addition to creation of the differential image, the change detection unit S140 is able to acquire vehicle behavior information such as the exposure state of the camera, environment of surrounding light sources, vehicle speed, and steering angle and control creation of the differential images and the processing of a shape decision unit in step S150 according to the acquired information.

The state of exposure of the camera, which is acquired by monitoring the sensitivity of the on-vehicle camera 111, indicates whether or not the sensitivity of the on-vehicle camera 111 has been changed (i.e., whose gain has been adjusted). The sensitivity of the on-vehicle camera 111 is changed, for instance, in case that the brightness of the captured image is abruptly changed due to, for instance entrance of the own vehicle into a tunnel. Based upon assumption that if the sensitivity of the on-vehicle camera 111 is changed, a change in the captured image is caused by the change of sensitivity of the on-vehicle camera 111, the monitoring device 100 detects attachments by means of differential image and then replace the amount of change equal to or smaller than a predetermined value by 0 in order to prevent the occurrence of erroneous detection of the attachments. With these measures, the following advantageous effect is obtained. That is, the occurrence of erroneous detection of the attachments due to changes, which will occur at the entrance or exit of a tunnel or when head-light of a vehicle which is following up the own car hits at night, can be effectively prevented.

The surrounding light source environment is acquired on the basis of the state of exposure of the camera and the image captured by a camera. It is used for deciding whether the surroundings are at day time, night time or dark night. The dark night, which is a kind of night time, indicates a situation that at night time, there is little light source and the target of recognition is difficult to see. If the exposure time of the camera is shorter than a threshold value, it is decided that the surrounding environment is bright and it is day time, If the exposure time of the camera is longer than the threshold value, it is decided to be night time or dark night. The image obtained from the camera is digitized using a predetermined threshold value and the number of white labels is counted. With this measure, the number of light sources such as street lamps, shop lights, and head-lights of vehicles other than the own vehicle can be acquired. If the acquired number of light sources is equal to or smaller than the predetermined number, it is decided to be dark night. If, on the other hand, the number of light sources is greater than the predetermined number, it is decided to be day time.

If there occurs a change in vehicle speed equal to or greater than the predetermined threshold value, the detection of the change may be temporarily avoided and the vehicle behavior information indicating that no area corresponding to a difference is found in the differential image may be outputted. With this measure, the occurrence of erroneous detection due to an image change caused by swinging of the vehicle body to a greater extent at the time of acceleration or deceleration can be advantageously prevented. The same is true in case that the steering angle is relatively large. In particular, the occurrence of erroneous detection, which occurs in case that the position of light source such as the sun changes, can be effectively prevented. The threshold value of steering angle may be varied depending on the vehicle speed. If varied, it is equivalent to prevent the occurrence of erroneous detection according to the amount of change in the position of light source.

In step S150 in FIG. 9, a block of pixels corresponding to the difference contained in the differential image created in step S140 is subjected to decision as to whether or not it is an attachment on the basis of a decision as to whether or not it has a predetermined shape. Hereafter, the decision on the shape made in step S150 is referred to as a shape decision unit S150. The block of pixels is detected from the differential image by using well-known edge detection processing, labeling processing or the like. The shape decision unit S150 makes a decision on each of aspect ratio, filling rate (details of which will be described later), area, and concaveness rate (details of which will be described later) of the block of pixels. If a positive decision is made in all of the decisions, the block of pixels is deemed as an image of attachment. The outputs of the shape decision unit S150 include the attachment position mask 134 shown in FIG. 4 and the detection result table 136 shown in FIG. 6.

(Shape Decision on the Basis of Aspect Ratio)

Referring to FIG. 13(a), shape decision on the basis of aspect ratio is explained. The shape decision unit S150 calculates a ratio H/W of a length H along the vertical direction of the captured image to a length W in the horizontal direction of the captured image for a block of pixels contained in the differential image as an aspect ratio. If the aspect ratio H/W is equal to or greater than a threshold value Th1 and equal to or smaller than a predetermined threshold value Th2, the shape decision unit S150 makes a positive decision in the shape decision on the basis of aspect ratio. If, on the other hand, the aspect ratio H/W is smaller than the predetermined threshold value Th1 or larger than the predetermined threshold value Th2, the shape decision unit S150 makes a negative decision in the shape decision on the basis of aspect ratio. The threshold values Th1 and Th2 are adjusted by the change detection unit S140 and so on.

(Shape Decision on the Basis of Filling Rate)

Referring to FIG. 13(a), shape decision on the basis of filling rate is explained. In the shape decision on the basis of filling rate, the shape decision unit S150 calculates a ratio S/(HW) of a product HW of a length H along the vertical direction of the captured image and a length W along the horizontal direction of the captured image and an area S of the block of pixels as a filling rate. If the filling rate S/(HW) is equal to or greater than a predetermined threshold value Th3 and equal to or smaller than a predetermined threshold value Th4, it makes a positive decision in the decision on the basis of the filling rate. If, on the other hand, the filling rate S/(HW) is smaller than the predetermined threshold value Th3 or larger than the predetermined threshold value Th4, it makes a negative decision in the decision on the basis of the filling rate. The threshold values Th3 and Th4 are adjusted by the change detection unit S140 and son.

(Shape Decision on the Basis of Area)

Shape decision on the basis of area is explained. If the area S of the block of pixels contained in the differential image is equal to or greater than a threshold value Th5 and equal to or smaller than a predetermined threshold value Th6, the shape decision unit S150 makes a positive decision in the shape decision on the basis of area. If, on the other hand, the area S is smaller than the predetermined threshold value Th5 or larger than the predetermined threshold value Th6, it makes a positive decision in the shape decision on the basis of area. The threshold values Th5 and Th6 are adjusted by the change detection unit S140 and so on.

(Shape Decision on the Basis of Concaveness Rate)

Referring to FIG. 13(b), shape decision on the basis of concaveness rate of contour is explained. The shape decision unit S150 makes a decision on the shape of the block of pixels on the basis of a change in the direction of a tangent vector at a point on a contour of the block of pixels contained in the differential image (for instance, contour 50 in FIG. 13(b)), when the contour is traced anticlockwise starting from the uppermost point of the block of pixels (for instance point 51 in FIG. 13(b)). If the block of pixels is a convex figure such as a circle, the direction of the tangent vector changes anticlockwise if the contour of the block of pixels is traced anticlockwise. On the other hand, the direction of the tangent vector may change clockwise, for instance, at a site such as a concave 52 in FIG. 13(b).

The shape decision unit S150 calculates the direction of the tangent vector at each of the pixels that constitute the contour of the block of pixels for each block. FIG. 13(b) illustrates by an example a portion of the tangent vector of which the direction with respect to the contour 50 of the block of pixel is calculated. The shape decision unit S150 sequentially acquires the direction of the tangent vector of each of the pixels that constitute the contour of the block of pixels along the contour anticlockwise for each block. It compares the acquired direction of the tangent vector at a pixel with the direction of the tangent vector acquired at the immediately preceding pixel to decide whether or not the direction of the tangent vector changes anticlockwise or clockwise. It calculates the number (M) of times in which the direction of the tangent vector rotated anticlockwise and the number of times (N) in which the direction of the tangent vector rotated clockwise and calculates a concaveness rate N/(M+N). It makes a positive decision on the shape detection on the basis of concaveness rate if the concaveness rate N/(M+N) of each of the blocks of pixels is equal to or larger than a predetermined threshold value Th7 and equal to or smaller than a predetermined threshold value Th8. If, on the other hand, the concaveness rate N/(M+N) is smaller than the predetermined threshold value Th7 or larger than the predetermined threshold value Th8, it makes a positive decision on the shape decision on the basis of concaveness rate. The threshold values Th7 and Th8 are adjusted by each part of the change detection unit S140.

Next, in step S160 in FIG. 9, a decision is made as to whether or not the engine is stopped. This decision may be achieved by acquiring an engine disconnection signal via CAN or on the basis of stoppage of power supply to the monitoring device 100. If the power supply is stopped, the power supply may at once be switched to one from an internal storage battery of the monitoring device 100 or an external storage battery connected to the monitoring device 100, not shown. In the above, an example of the case in which the engine is stopped is explained. However, the engine does not have to be stopped and simply a termination signal to the monitoring device 100 to terminate it may be used instead. In any rate, it is sufficient to detect that the system is almost stopped and entered into a mode in which power consumption is reduced.

If the engine is stopped ("Yes" in S160), the attachments information table is updated in step S170. The attachments information table is updated with respect to corresponding pieces of information by using the attachment position mask 134 and the detection result table 136 outputted at the shape decision unit S150. Use of the attachment position mask 134 thus obtained enables the firmly fixed attachments that adhered at the start of the traveling and new attachments to be handled separately.

Next, the processing at the time of ordinary recognition illustrated in FIG. 8 is explained with reference to the flowchart shown in FIG. 10. The flowchart in FIG. 10 resembles the flow at the time of the initial diagnosis; steps S110, S120 and S130, the change detection unit S140, the shape decision unit S150 are the same therebetween.

In step S260, the ECU 110 performs calculation, as new attachment extracting processing, relative to new attachments other than the attachments attached at the time of initial diagnosis by using the attachment position mask 134 outputted by the shape decision unit S150 at the time of the initial diagnosis after the attachment position mask 134 (hereafter, attachment position image) is outputted by the shape decision unit S150 at the time of ordinary recognition. This is achieved by comparing the attachment position image with a corresponding firmly fixed attachment position image according to a method of raster scanning starting from the left upper portion thereof pixel by pixel. Attachment area, center of gravity of attachment and so on are counted for only those pixels that are judged to have attachments at the attachment position image and to have no attachment at the firmly fixed attachment position image to create a detection result table 136 relative to newly adhered attachments. Advantageously, use of the detection result table 136 relative to the newly adhered attachments enables operation of the washing system if the newly adhered same or different type of contaminants is present even if the dirt that was not removed by the washing is firmly fixed to a portion of the screen.

Next, in step S270, a decision is made as to whether or not the engine is topped. This decision may be achieved by acquiring an engine disconnection signal via CAN or on the basis of stoppage of power supply to the monitoring device 100. If the power supply is stopped, the power supply may at once be switched to one from an internal storage battery of the monitoring device 100 or an external storage batter connected to the monitoring device 100, not shown. In the above, an example of the case in which the engine is stopped is explained. However, the engine does not have to be stopped and simply a termination signal to the monitoring device 100 to terminate it may be used instead. In any rate, it is sufficient to detect that the system is almost stopped and entered into a mode in which power consumption is reduced.

If the engine is stopped ("Yes" in S270), the attachments information table 135 is updated in step S280. After the engine is stopped and the washing system is stopped, neither the firmly fixed attachments nor new attachments are washed. In this regard, the attachment position mask 134 is created on the basis of judgment that any attachment is present at coordinates corresponding to those at which any one of the firmly fixed position image and the attachment position image at the time of stoppage (in other words, a logical sum (or) of the fixed position image and the attachment position image is acquired). This is reflected to the attachments information table 135. The resultant attachments information table 135 is read-out at the time of next initial diagnosis to shorten the time required for the initial diagnosis.

In addition, use of washing device operation information, which is not shown, to temporarily stop the operation of the image recognition logic while the washing device is being operated in step S260, enables the occurrence of erroneous detection due to change in image accompanying the washing operation to be prevented.

According to the first embodiment explained earlier, the following operations and the advantageous effects can be obtained. The vehicle surroundings monitoring device 100 includes the captured image acquisition unit 101, the attachments detection unit 102, the lens state decision unit 103, the lens washing unit 104, the lens state recording unit 105, the lens state reading unit 106, the recording unit 107, and the vehicle information acquisition unit 108. This construction enables useless washing to be avoided.

(Second Embodiment) <In Case Inoperable State is Present>

A second embodiment according to the present invention is explained. According to the second embodiment of the present invention, first at the time of starting the engine, an inoperable state in addition to the attachments information recorded at the time of the previous stoppage of the engine is read in. Next, during traveling within a predetermined time after the start of the engine (hereafter, referred to "within an initial diagnosis time"), the surroundings of the vehicle is monitored with an on-vehicle camera to decide attachment of rain droplets, mud, white turbidity, water droplet marks, foreign matter such as fallen leaves and so on. If the amount of attachments increased as compared with the recorded amount of attachments by a predetermined amount or more, the washing device is operated. Then, at the time when the engine is stopped, the attachments information and the inoperable state are recorded.

That is, the second embodiment is different from the first embodiment in that the inoperable state is read in and recorded. Accordingly, explanation is omitted on the parts that are common with the first embodiment and detailed explanation is focused on the parts that are different from the first embodiment.

The vehicle surroundings monitoring device 200 according to the second embodiment includes, as shown in FIG. 7, the captured image acquisition unit 101, the attachments detection unit 102, the lens state decision unit 103, the lens washing unit 104, the lens state recording unit 105, the lens state read-out unit 106, the recording unit 107, the vehicle information acquisition unit 108, and a recognition state decision unit 109. The captured image acquisition unit 101 acquires captured images that are captured at predetermined time intervals by the on-vehicle camera (not shown in FIG. 7). The attachments detection unit 102 has means for detecting at least one type of attachments such as mud, water droplets, white turbidity and foreign matters such as fallen leaves or the like. The lens state decision unit 103 compares a lens state read-out by the lens state read-out unit 106 described later from the recording unit 107 described later with a lens state obtained from the attachments detection unit 102 and decides whether or not the amount of attachments at the lens increased in order to decide a state in which image recognition is inoperable or the lens state is at a level at which the performance of image recognition is decreased. The lens washing unit 104 transmits an activation signal to a lens washing device that is capable of performing at least one of air blasting, washer fluid spraying, and wiper operation to activate it and have the lens surface washed. The vehicle information acquisition unit 108 acquires at least one piece of vehicle information among vehicle speed, wheel speed, steering angle, illumination information, wiper operation switch information, and yaw rate information. The lens state recording unit 105 transmits the lens state at the time when the engine was stopped to the recording unit 107 to cause it to be recorded therein. The lens state read-out unit 106 reads out the lens state from the recording unit 107 at the time of starting the engine. The recognition state decision unit 109 decides whether the image recognition is in an inoperable state, or the recognition performance of image recognition is in a decreased state.

FIG. 2 presents a block diagram illustrating the relationship between the vehicle surroundings monitoring device 200 and peripheral devices thereof FIG. 2 depicts an ECU 110 as the ECU that constitutes the vehicle surroundings monitoring device 200. On the input side of the ECU 110 that constitutes the vehicle surroundings monitoring device 200 are connected an on-vehicle camera 111, a vehicle speed sensor 121, a steering angle sensor 122, an illumination sensor 123, a wheel speed sensor 124, a wiper operation switch 125, and a yaw rate sensor 126. In addition, on the output side of the ECU 110 that constitutes the vehicle surroundings monitoring device 200 are connected a speaker 112, a monitor 113, a lens washing device 115, and an inoperable state warning light 114.

The inoperable state warning light 114 notifies to the user that the system is inoperable if the lens is extremely contaminated or the illumination environment is extremely aggravated. The inoperable state warning light 114 may display the notification of the inoperable state in superimposition to the video image displayed at the monitor 113 or in the form of an icon. Alternatively, it may be configured, independently of the monitor 113, to notify the result of recognition only with a lamp such as an LED or an electric bulb or only with a warning sound or a voice. Also, it may be one that includes all of them.

In the case of the second embodiment, the attachments information table 135 includes at least one of a detection result table 136, an inoperable state occurrence counter 137, and an inoperable state cause history 138.

The inoperable state occurrence times counter 137 records the number of times of the occurrence of inoperable state for each cause therefor if the inoperable state occurred. If the inoperable state is resolved, the number of the times of the occurrence of inoperable state is cleared. During the time from the stoppage of the engine to the start of the engine next time, it is possible that the user will wash the lens manually. Therefore, the decision as to whether or not washing was performed should be done at once after the start of the engine. Advantageously, recording of the number of times of the occurrence of inoperable state for each cause enables the execution of a detection logic suffering a relatively larger number of times of the occurrence of inoperable state is performed on a priority basis and decision as to whether or not the cause of inoperable state in the previous time has been resolved to be performed at once.

The inoperable state occurrence times counter 137 may be configured to record only the number of times of the occurrence of inoperable state for all the causes without specifying each cause of inoperable state. Usually, the decision on inoperable state is difficult to perform with only one frame of still image. The stability and reliability of the result of the decision are increased by accumulating images captured for a certain period of time or accumulating results of decision. It takes a certain period of time until the results of the detection of inoperable state are finally settled. If, within the time when the results are finally settled after the start of the engine, operation of the vehicle for a short period of time is repeated such as the case in which the engine is stopped again, the number of times of the occurrence of inoperable state is increased and if it exceeds a predetermined number of times, the number of times and the inoperable cause history are cleared. With these measures, the following advantageous effects can be obtained. That is, it is usually the case that washing is retarded if the inoperable state is caused by the same factor as before. However, if traveling for a short period of time is repeated a predetermined number of times or more often, the possibility that a new attachment adheres to the lens is increased. In such a case, the result of the diagnosis of the lens enables washing operation to be done to prevent worsening of the state of the lens. In addition, stoppage of the engine before the result of the decision on the inoperable state is settled results in deletion of the contents of the recording in a non-decided state. With the measures above, useless washing operation can be prevented at next traveling.

FIG. 14 illustrates an example of the inoperable state cause history 138. The inoperable state cause history 138 includes a flag used in deciding whether or not the inoperable state occurs for each cause. For instance, in FIG. 14, flags are set to the cause "white turbidity" and the cause "water droplet mark", respectively. The flag is set on the basis of the result of detection by the attachment detection logic. If it is decided on the basis of this flag state that the inoperable state occurred due to the same cause, washing is not performed. This provides the following advantageous effects. If the same cause of the inoperable state as that in the previous time is present this time, useless washing operation can be saved. If, on the other hand, the inoperable state is due to new cause, an appropriate washing operation corresponding to the new cause can be performed. The inoperable state mentioned above may be called a "fail state".

The operation of the vehicle surroundings monitoring device 200 according to the second embodiment is explained based on the flowchart of FIG. 8. The vehicle surroundings monitoring device 200, similarly to the first embodiment, has two states, i.e., a state in which initial diagnosis processing is executed and a state in which ordinary recognition processing is executed. According to the second embodiment, the processing in FIG. 8 is executed by the ECU 110 that constitutes the vehicle surroundings monitoring device 200.

First, in step S10, the ECU 110 decides whether or not conditions under which the initial diagnosis is to be executed are met. If the conditions are met, the initial diagnosis counter is set to 0 and the process proceeds to step S20. This decision is made by using at least one of vehicle speed, steering angle, and day-night decision state and if such is met, it is decided that conditions for stable traveling are met ("Yes" in S10). If a decision is made that the condition or conditions for stable traveling are not met ("No" in S10), the execution of the initial diagnosis is skipped.

Next, in step S20, the initial diagnosis is executed. The initial diagnosis executes various detection operations for detecting attachments such as water droplets detection, mud detection, white turbidity detection, water droplet marks detection, and foreign matter adherence detection. Each time when any one of the detections operations is executed, the initial diagnosis counter is incremented.

In step S30, it is decided whether or not the engine is stopped. If a decision is made that the engine is not stopped ("No" in step S30), the processing is continued further ahead, If the engine is stopped ("Yes" in step S30), the attachments information table 135 is updated in case the result of inoperable state is made in the initial diagnoses executed up until that point in time and the process proceeds to step S80. As a result, if the amount of attached contaminants (dirt) is equal to or larger than a predetermined amount, the user is alerted to take precautions against the state of contamination before the result of image recognition is issued at the time of next start of the engine. This enables the inoperable state warning light 114 to be lit.

In step S40, it is decided whether or not the initial diagnosis is completed. If the initial diagnosis has been completed ("YES" in step S40), the process proceeds to step S50 and the processing of ordinary recognition is started. If the initial diagnosis has not been completed ("NO" in step S40), the process proceeds to step S20 and the processing of the initial diagnosis is continued further ahead.

In step S50, the attachment detection at the lens surface of the on-vehicle camera 111 such as water droplets detection, mud detection, white turbidity detection, water droplet marks detection, or foreign matter adherence detection is executed. This processing is similar to that according to the first embodiment, explanation thereof is omitted.

In step S60, notification to the washing system and the inoperable state decision unit is performed to on the basis of the amount of attachments outputted in step S50. Details of the content are described later. The second embodiment is different from the first embodiment in that the notification is also made to the inoperable state decision unit.

In step S70, it is decided whether or not the engine is stopped. If the engine is not stopped ("No" in step S70), the processing is continued further ahead. If the engine is stopped ("Yes" in step S70), the attachments information table 135 is updated in case the result of inoperable state decision is issued in the initial diagnosis executed up to that point in time and the process proceeds to step S80. In step S80, the contents of the attachment position mask and the attachments information table are recorded by using the recording unit 107 (attachments information recording).

In addition, explanation is made on the processing at the time of initial diagnosis at the vehicle surroundings monitoring device 200 according to the second embodiment based upon the flowchart illustrated in FIG. 9. The processing in FIG. 9 is largely similar to the corresponding one according to the first embodiment. However, the operation in step S170 may be changed as follows. Note that in the second embodiment, the processing in FIG. 9 is executed by the ECU 110 that constitutes the vehicle surroundings monitoring device 200.

If the engine is stopped ("Yes" in step S160), the attachments information table is updated in step S170. The attachments information table is updated with respect to corresponding pieces of information by using the attachment position mask 134 and the detection result table 136 outputted at the shape decision unit S150. In addition, the inoperable state occurrence times counter is changed.

The operation of the inoperable state occurrence times counter is explained. If the engine is stopped before the initial diagnosis is completed, the inoperable state occurrence times counter is incremented by one. However, the inoperable state occurrence times counter is set back to 0 and the content of the inoperable state cause history is cleared if the inoperable state occurrence times counter has more than a predetermined value (for example 8) at tha time. In addition, if inoperable state occurs during the initial diagnosis, the inoperable state occurrence times counter is set back to 0 and the inoperable state this time is added to the content of the inoperable state cause history.

If the initial diagnosis is completed, the inoperable state occurrence times counter is set back to 0 and the content of the inoperable state cause history is maintained unchanged as compared with the previous one. With these measures, the inoperable state can be held even if short distance driving is repeated or only the engine is started or stopped, that is, even if the engine is stopped during the initial diagnosis. Accordingly, an advantageous effect of preventing unnecessary washing operation can be obtained. If the short distance driving is repeated a predetermined number of times or more, the inoperable state occurrence cause history is cleared to 0. This enables the washing operation to be performed by using the result of contamination detection again.

I addition, the processing of ordinary recognition at the vehicle surroundings monitoring device 200 according to this embodiment is explained based upon the flowchart in FIG. 10. The processing in FIG. 10 is largely similar to the corresponding one according to the first embodiment. However, the operation in step S260 in which new attachments extraction processing is executed may be changed as follows. Note that in the second embodiment, the processing in FIG. 10 is executed by the ECU 110 that constitutes the vehicle surroundings monitoring device 200.

In step S260, if the amount of attachments increased in an area where no attachment is found at the time of the initial diagnosis, attachments information about the new attachments is outputted. In addition, attachments information is calculated for a combination of the attachments information at the time of the initial diagnosis and the attachments information about the new attachments, in other words, for an attachment position image obtained by logical addition (or) of a fixed attachment position image and an attachment position image (hereafter, referred to "attachments summing image").

This is achieved, for instance, as follows. Areas for storing information are secured for storing the attachments information for new attachments and the attachments information for storing the attachments summing image, respectively, in the on a storage region. The attachment position image and the attachment summing image are compared by the raster scanning method pixel by pixel starting from left upper portion. The area of attachments, center of gravity of attachments, etc., are counted only for those pixels that are judged to have attachments on both the images. In this manner, the detection result table 136 is created. With this measure, an advantageous effect that both of the judgment of output for washing operation and the judgment of detection inoperable state can be performed appropriately.

(Third Embodiment) <In Case Day-Night State is Present>

A third embodiment of the present invention is explained. In the third embodiment, first, the attachments information recorded at the time of the last stoppage of the engine is read in at the time when the engine is started. Next, during traveling within a predetermined period of time after the start of the engine (hereafter, referred to as "within an initial diagnosis time"), the surroundings of the vehicle is monitored with an on-vehicle camera to decide situations in which surrounding light source environment is different such as day and night and decide attachment of foreign matter such as rain drops, mud, white turbidity, water droplet marks, foreign matter such as fallen leaves and so on depending on the surrounding light source environment. If the amount of the attachments increases by a predetermined amount or more as compared to the amount of the attachments recorded, the washing device is operated. Then, at the time the engine is stopped, the attachments information is recorded.

That is, this embodiment is different from the first embodiment in that its operation is varied situation for each different situation of surrounding light source environment. For this reason, description is omitted for the parts that are common with the first embodiment and detailed description is focused on the corresponding parts different therefrom. Note that similarly to the second embodiment, inoperable state that occurs in case that if the lens is extremely contaminated or the illumination environment is extremely worsened may be recorded.

In case of the third embodiment, as shown in FIG. 15, the attachments information table 135 includes at least one of a day-night decision result at the time of previous traveling, a detection result table 136 indicating result of detection for each of day and night by each attachment detection logic, an inoperable state occurrence times counter 137, and an inoperable state cause history 138.

In case that the attachments are detected by image recognition, the attachments are seen differently whether it is in a day state or a night state. Accordingly, the result of each of the detections may be recorded separately depending on the day-night decision state at the time when the attachments are detected. Recording separately provides the following advantageous effect. That is, for attachments that are easy to detect at night time but difficult to at day time, instance, water droplet marks, it becomes possible to decide whether or not the attachments continue to adhere. In addition, the attachments would disturb recognition logics with which the system is primarily intended to perform recognition, such as vehicle detection, pedestrian detection, lane marking detection, and traffic mark detection. In this case, the degree at which the attachments would disturb the recognition logics differently depending on the illumination environment. Accordingly, also for an inoperable state in which the system is not operable due to a large amount of attachments, separate recording depending on the day-night decision state enables the system to be set differently for day and night, i.e., to be operated only for day time and to be inoperable for night time. This provides an advantageous effect of increasing the availability rate of the recognition logic.

The embodiments explained earlier may be modified as follows.

(Variation Example 1)

The attachment position mask is not limited to the attachment position mask 134 shown in FIG. 4. For instance, as shown in FIG. 11(b), information may be carried in units of block instead of pixel. On this occasion, a block including the attachment area 133 in units of pixel can be treated as an attachment block 233. Treating the attachment position in units of block enables the deviation of position that depends on the detection method of the attachment detection unit to be reduced.

That is, for instance, in case that an attachment detection unit X adopts a method of image processing technique that detects an edge of the attachment whereas an attachment detection unit Y adopts an image processing technique that detects a time-dependent change in luminance of the contamination, there occurs deviation of position when treated in units of pixel. Accordingly, pixels are blocked by an appropriate size (for instance, 8×8 pixels) to create attachment blocks 233 to thereby absorb position deviations. This provides an advantageous effect of enabling integration of results of detection by a plurality of attachment detection units.

(Variation Example 2)

The attachment position mask is not limited to the attachment position mask 134 shown in FIG. 4. For instance, as shown in FIG. 11(b), information may be carried in units of screen instead of pixel. In other words, the system is configured to have no position information but have information about adherence or non-adherence of a certain type of attachment of interest. This has the following advantageous effect. That is, the configuration of providing information about presence or absence of a specific type of attachment in units of screen enables the results of detection by the attachment detection unit to be integrated even if the attachment detection unit X has a main target area of processing at a lower part of the screen and the attachment detection unit Y has a main target area of processing at both lateral sides of the screen, in other words, if suitable processing area or suitable processing resolution is different depending on the attachment detection unit.

The embodiments and variation examples explained earlier are only exemplary and the present invention is not limited to these contents as far as the features of the present invention are not damaged. As far as the features of the present invention are not damaged, the embodiments and variation examples explained earlier may be combined in working.

The disclosure of the following priority application is herein incorporated by reference: Japanese Patent Application No. 2012-149869 filed Jul. 3, 2012.

EXPLANATION OF SYMBOLS

100 vehicle surroundings monitoring device
101 captured image acquisition unit
102 attachment detection unit
103 lens state decision unit
104 lens washing unit
105 lens state recording unit
106 lens state read-out unit
107 recording unit
108 vehicle information acquisition unit
111 on-vehicle camera
112 speaker
113 monitor
114 inoperable state warning light
115 lens washing device
121 vehicle speed sensor
122 steering angle sensor
123 illumination sensor
124 wheel speed sensor
125 wiper operation switch 126 yaw rate sensor
131 camera lens
132 attachment
133 attachment area
134 attachment position mask
135 attachments information table
136 detection result table
137 inoperable state occurrence times counter
138 inoperable state cause history
200 vehicle surroundings monitoring device
220 on-vehicle camera
230 attachment

The invention claimed is:

1. A vehicle surroundings monitoring device comprising:
at least one processor executing stored instructions to:
acquire an image of surroundings of a vehicle by a camera mounted on the vehicle;
decide a state in which foreign matter adheres to a lens of the camera;
decide that the lens is in a lens state in which performance of image recognition is reduced based on the decision that the foreign matter adheres to the lens of the camera, wherein the lens state includes a state that image recognition is inoperable;
record the lens state and information as to whether or not image recognition is inoperable in memory upon termination of a system;
read out the lens state and the information as to whether or not the image recognition is inoperable recorded in memory upon start of the system; and
output a start signal that commands start of a wash based upon the decision that the lens is in the lens state in which performance of image recognition is reduced.

2. The vehicle surroundings monitoring device according to claim 1, wherein the at least one processor executing stored instructions to:
decide whether or not operation of the image recognition of the image is possible based upon the lens state read out.

3. The vehicle surroundings monitoring device according to claim 2, wherein
the start signal that commands start of the wash is based upon a result of the decision of whether or not operation of the image recognition of the image is possible.

4. The vehicle surroundings monitoring device according to claim 2, wherein the at least one processor executing stored instructions to:
perform one or more of: (i) a vehicle detection processing, (ii) a pedestrian detection processing, (iii) a lane line recognition processing, and (iv) a traffic mark recognition processing in case that operation of the image recognition is possible.

5. The vehicle surroundings monitoring device according to claim 1, wherein the at least one processor executing stored instructions to:
decide a surrounding light source environment based on the acquired image and decides the state in which the foreign matter adheres to the lens of the camera based on the surrounding light source environment;
record information about the lens state and the surrounding light source environment upon termination of the system; and
read out the information about the lens state and the surrounding light source environment recorded in the memory upon start of the system.

6. The vehicle surroundings monitoring device according to claim 1, wherein the at least one processor executing stored instructions to:
detect attachment that adheres to the lens of the camera;
decide whether or not the detected attachment that adheres to the lens of the camera increased; and
output the start signal that commands start of the wash that washes the lens of the camera based on the decision that the attachment that adheres to the lens of the camera increased, and output no start signal that commands start of the wash that washes the lens of the camera based on the decision that the attachment that adheres to the lens of the camera increased.

7. The vehicle surroundings monitoring device according to claim 6, wherein the at least one processor executing stored instructions to:
upon termination of the system, record in memory a state of the detected attachment that adheres to the lens of the camera,
upon start of the system, read out the state of the attachment that adheres to the lens of the camera recorded in memory,
upon start of the system, detect the attachment that adheres to the lens of the camera,
decide upon start of the system whether or not the detected attachment that adheres to the lens of the camera increased as compared with that upon termination of the system, based upon the state of the detected attachment that adheres to the lens of the camera detection upon start of the system and the read out state of the attachment that adheres to the lens of the camera; and
upon start of the system, decide whether or not the start signal commands start of the device wash.

* * * * *